(12) United States Patent
Gibbs

(10) Patent No.: US 6,614,639 B1
(45) Date of Patent: Sep. 2, 2003

(54) CONTROL SYSTEM INCLUDING RECTIFIER AND METHOD FOR CONTROLLING RECTIFIER BRIDGE BY DISABLING GATING OF SEMICONDUCTOR DEVICE BASED UPON HEAT SINK OR JUNCTION TEMPERATURE

(75) Inventor: Irving A. Gibbs, Fletcher, NC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/159,887

(22) Filed: May 30, 2002

(51) Int. Cl.$^7$ .................................................. H02H 5/04
(52) U.S. Cl. ........................................................ 361/103
(58) Field of Search .............................. 361/103, 115, 361/100; 363/141, 84, 87, 128

(56) References Cited

U.S. PATENT DOCUMENTS

| | | | |
|---|---|---|---|
| 4,010,342 A | 3/1977 | Austin | |
| 4,429,205 A | 1/1984 | Cox | |
| 4,739,229 A | 4/1988 | Heiler, Jr. | |
| 5,040,724 A | 8/1991 | Brinkruff et al. | |
| 5,963,440 A | * 10/1999 | Gibbs et al. | ................... 363/54 |
| 5,963,441 A | 10/1999 | Gibbs et al. | |
| 6,007,239 A | 12/1999 | Nickol | |
| 6,046,917 A | 4/2000 | Gibbs et al. | |
| 6,203,191 B1 | 3/2001 | Mongan | |
| 6,208,120 B1 | 3/2001 | Gibbs | |
| 6,232,751 B1 | 5/2001 | Farr et al. | |
| 6,237,566 B1 | * 5/2001 | Spaulding | .............. 123/406.44 |

* cited by examiner

Primary Examiner—Brian Sircus
Assistant Examiner—Boris Benenson
(74) Attorney, Agent, or Firm—Martin J. Moran (57) ABSTRACT

A control system includes a rectifier bridge including a heat sink having a temperature, and also including an SCR having a gate. The SCR thermally engages the heat sink. A circuit controls the rectifier bridge through the gate of the SCR. An RTD circuit measures the temperature of the heat sink. A circuit disables gating of the SC based upon the temperature of the heat sink.

2 Claims, 5 Drawing Sheets

CONTROL SYSTEM INCLUDING RECTIFIER AND METHOD FOR CONTROLLING RECTIFIER BRIDGE BY DISABLING GATING OF SEMICONDUCTOR DEVICE BASED UPON HEAT SINK OR JUNCTION TEMPERATURE

BACKGROUND OF THE INVENTION

1. Field of the Invention

The present invention relates to control systems and, more particularly, to control of rectifiers employing semiconductor devices, such as silicon controlled rectifiers (SCRs). The invention also relates to a method for controlling a rectifier bridge.

2. Background Information

Three-phase rectifier circuits are commonly employed to convert AC signals to DC signals. These circuits often use SCRs disposed in bridge segments, with typically one SCR for each polarity of each AC phase. Typically, a bridge firing control circuit controls the firing point for each rectifier in each AC cycle. Examples of such circuits are disclosed in U.S. Pat. Nos. 5,963,440; 5,963,441; 6,046,917; 6,208,120; and 6,232,751.

It is not uncommon for a plurality of SCR bridges to be operated in parallel with each of the corresponding bridge firing control circuits being controlled by a central firing control circuit. The central firing control circuit manages each of the bridge firing control circuits in order that the corresponding rectifiers in each of the parallel bridges conduct current at the same point in the AC waveform.

SCR bridges are commonly employed in an excitation control system to provide field excitation for a rotating electrical apparatus (e.g., large synchronous generators and motors, utility synchronous generators and motors, industrial synchronous motors and generators, synchronous generators and motors for naval or other shipping applications, synchronous generators and motors for oil well drilling rigs).

A Resistance Temperature Detector (RTD) senses temperature by providing a variable electrical resistance of a metal, which resistance changes with temperature. Platinum is the most commonly used metal for RTDs due to its stability and nearly linear temperature versus resistance relationship. Platinum also has the advantages of chemical inertness, a temperature coefficient of resistance that is suitably large in order to provide readily measurable resistance changes with temperature, and a resistance which does not drastically change with strain. Other types of RTDs include copper, nickel and nickel alloys.

The RTD's resistance versus temperature relationship is qualified by a term known as "alpha". "Alpha" is the average percent change in resistance per ° C. of an RTD between 0° C. and 100° C. For a 100 Ω platinum RTD, 0.00385Ω/Ω/° C. is the most common alpha. Alpha is also referred to as the temperature coefficient of resistance.

Circuits for sensing temperature from a variable RTD resistance are well known in the art. See, for example, U.S. Pat. Nos. 5,040,724; 6,007,239; and 6,203,191.

Modern excitation control systems typically measure the temperature of a thyristor heat sink assembly. The sensed temperature, in turn, is employed by the excitation control system to determine whether the thyristor is operating within suitable temperature design margins. Typically, a generator alarm or generator trip results when the temperature exceeds a predetermined threshold. The excitation control system may employ active current balance or active temperature balance controls to adjust the current or the temperature between parallel combinations of thyristor bridges. However, known current and temperature balance controls and known excitation control systems continue some level of thyristor gating even if the thyristor temperature is too high.

If a thyristor exceeds its safe operating temperature, then thermal runaway problems may occur. When the thyristor temperature reaches an excessive level, the thyristor fails and causes a short circuit in the thyristor bridge.

Accordingly, there is room for improvement in control systems and methods for controlling rectifier bridges.

SUMMARY OF THE INVENTION

These needs and others are met by the present invention, which disables gating of the semiconductor device, such as a thyristor or SCR, before it exceeds a critical temperature. This stops the thyristor or SCR from continuing to heat up and should, therefore, significantly reduce the chance of a short circuit in the rectifier bridge.

The present invention disables gating of the thyristor or SCR that has exceeded a threshold temperature. The temperature employed to compare against a critical threshold temperature may be a temperature of a heat sink for the thyristor or SCR. The temperature may also be thyristor or SCR junction temperature, which is calculated by adding a thermal drop to the measured heat sink temperature.

As one aspect of the invention, a control system comprises: a rectifier including a heat sink having a temperature, and also including a semiconductor device having a gate, the semiconductor device thermally engaging the heat sink; a circuit controlling the rectifier through the gate of the semiconductor device; a circuit measuring the temperature of the heat sink; and means for disabling gating of the semiconductor device based upon the temperature of the heat sink.

The circuit measuring the temperature of the heat sink may include an RTD, which thermally engages the heat sink. The means for disabling gating of the semiconductor device based upon the temperature of the heat sink may comprise means for providing a first signal, which is true when the RTD is not open; means for providing a second signal, which is true when the temperature of the heat sink is greater than a predetermined threshold; and means for disabling gating of the semiconductor device when the first and second signals are both true.

The predetermined threshold may be a first predetermined threshold; and the first signal may be true when the temperature of the heat sink is less than a second predetermined threshold.

The semiconductor device may have a junction and a junction temperature. The means for disabling may include means for measuring current flowing in the semiconductor device; means for calculating the junction temperature based upon the current; and means for disabling gating of the semiconductor device when the junction temperature exceeds a predetermined threshold.

As another aspect of the invention, a method for controlling a rectifier bridge including a heat sink having a temperature, and also including a semiconductor device thermally engaging the heat sink and having a gate, comprises: controlling the rectifier bridge through the gate of the semiconductor device; measuring the temperature of the heat sink; and disabling gating of the semiconductor device based upon the temperature of the heat sink.

The method may further comprise thermally engaging the heat sink with an RTD; measuring a value from the RTD; and determining the temperature of the heat sink from the value.

A first signal, which is true when the RTD is not open, may be provided. A second signal, which is true when the temperature of the heat sink is greater than a predetermined threshold, may be provided. Gating of the semiconductor device may be disabled when the first and second signals are both true.

The method may further comprise employing the semiconductor device having a junction and a junction temperature; calculating the junction temperature; and disabling gating of the semiconductor device when the junction temperature exceeds a predetermined threshold. The method may further comprise thermally engaging the heat sink with an RTD; measuring a value from the RTD; determining the temperature of the heat sink from the value; measuring current flowing in the semiconductor device; calculating heating of the semiconductor device from the current; calculating a temperature rise between the junction and the RTD; and calculating the junction temperature by adding the temperature rise to the temperature of the heat sink.

As another aspect of the invention, a control system comprises: a first rectifier bridge including at least one heat sink having a temperature, and also including at least one semiconductor device, which thermally engages such at least one heat sink and has at least one alternating current input, at least one gate and a direct current output; a second rectifier bridge including at least one heat sink having a temperature, and also including at least one semiconductor device, which thermally engages such at least one heat sink and has at least one alternating current input, at least one gate and the direct current output; a circuit controlling the first and second rectifier bridges through the at least one gate of the at least one semiconductor devices of the first and second rectifier bridges; a circuit measuring the temperature of at least one of the at least one heat sinks; and means for disabling gating of at least one of the at least one semiconductor devices based upon the temperature of a corresponding at least one of the at least one heat sinks.

The circuit measuring the temperature of at least one of the at least one heat sinks may include an RTD, which thermally engages the at least one of the at least one heat sinks and outputs a value. The means for disabling may include means for determining the temperature of the at least one of the at least one heat sinks from the value.

The means for disabling may further include means for providing a first signal, which is true when the RTD is not open; means for providing a second signal, which is true when the temperature of the at least one of the at least one heat sinks is greater than a predetermined threshold; and means for disabling gating of the at least one of the at least one semiconductor devices when the first and second signals are both true.

One of the at least one semiconductor devices may have a junction and a junction temperature. The means for disabling may include means for calculating the junction temperature; and means for disabling gating of the one of the at least one semiconductor devices when the junction temperature exceeds a predetermined threshold.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention is described in association with a bridge rectifier for an excitation control system, although the invention is applicable to a wide range of control systems and methods for controlling rectifier bridges.

Figure 1:
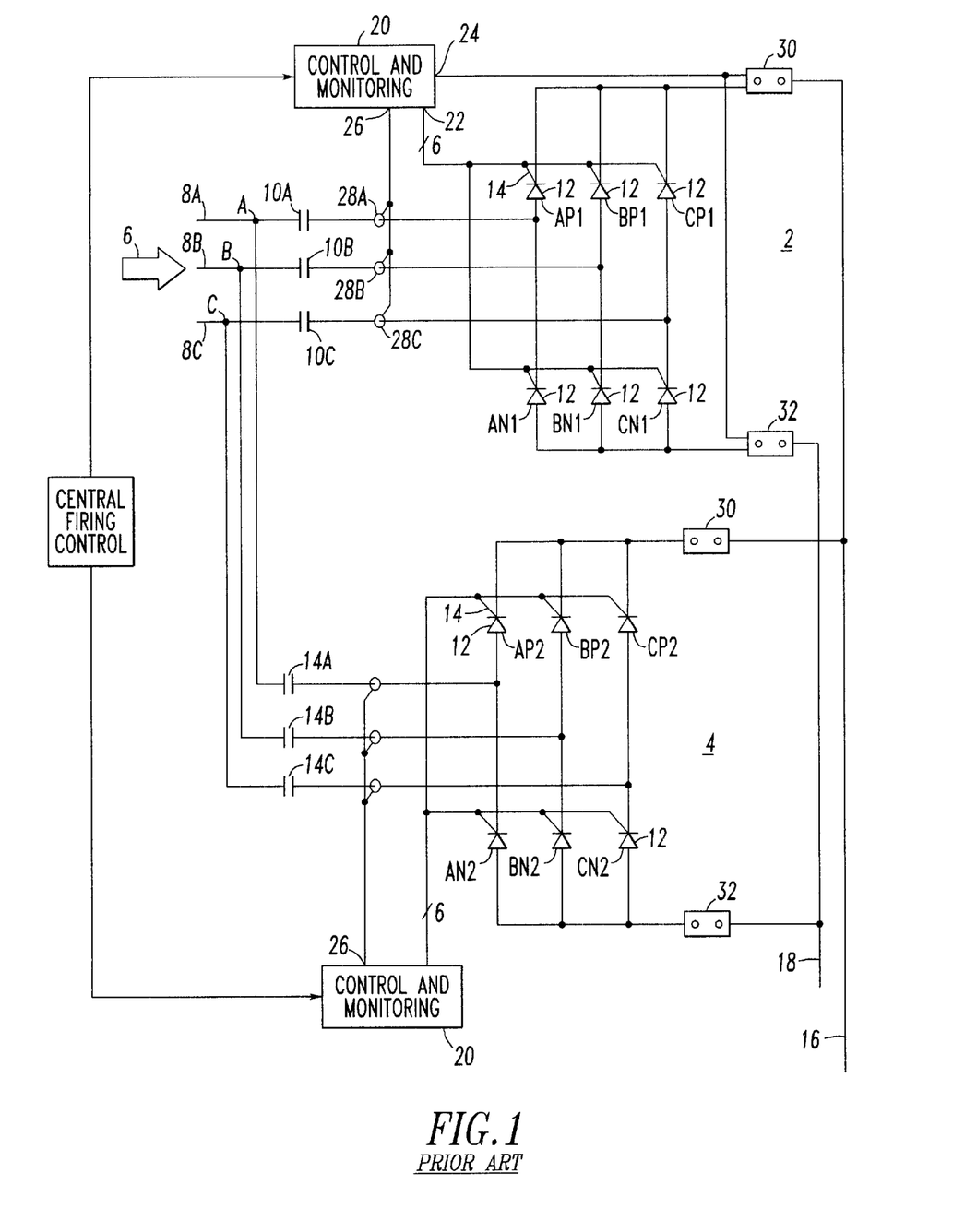
FIG. 1 is a circuit block diagram of two, three-phase, SCR bridges which are fed from a common three-phase source and are connected in parallel to provide an additive current output.

Bridges of semiconductor controlled rectifiers (SCRs) or thyristors are generally employed to convert alternating current (AC) sinusoidal signal waveforms to direct current (DC). As shown in FIG. 1, two controlled rectifier bridges 2,4 are connected in parallel. Each of the bridges 2,4 receives a multi-phase current input from a common AC source 6 (e.g., a motor generator, field transformer, power potential transformer (PPT)). A three-phase current input is employed in this example, although the invention is applicable to a wide range of phase counts. The several phases of input current, shown as 8A, 8B and 8C, are fed through contacts 10A, 10B and 10C, and 14A, 14B and 14C, respectively, to rectifying segments on the two respective bridges 2,4.

The exemplary bridges 2,4 each have six cells or segments, one for each polarity of each of the phase currents 8A, 8B, 8C, although the invention is applicable to a wide range of segment counts. For example, segment AP1 refers to the positive polarity of phase A in the first bridge 2, while segment AN1 refers to the negative polarity of phase A in that first bridge 2. The remaining segments of the first and second bridges 2,4 are noted in a similar manner by reference characters BP1,BN1,CP1,CN1 and AP2,AN2,BP2, BN2,CP2,CN2.

Each bridge segment includes its own element, such as the exemplary SCR 12, that has a firing input (or gate) 14. When a suitable control signal is provided to one of the inputs 14, the corresponding SCR fires to, thereby, control current conduction (e.g., by starting or initiating current conduction) within the corresponding segment. Typically, the individual segments of each of the bridges 2,4 are fired every 60° of the AC cycle in the order: APn,CNn,BPn,ANn,CPn,BNn (where, for convenience of reference, APn, for example, refers to either AP1 or AP2). One of the SCRs 12 does not stop conducting until it is reversed biased. All of the positive rectifier output currents are summed together and the negative rectifier output currents are similarly summed and conveyed by corresponding positive and negative conductors 16,18 to a load (not shown). Typically, the bridges 2,4 include one or more heat sinks (not shown) for the SCRs 12.

An exemplary microprocessor-based control and monitoring circuit 20 has six control outputs 22, which are interconnected with the six firing inputs 14 of the SCRs 12, for outputting control signals to the segments AP1,BP1,CP1, AN1,BN1,CN1 to control current conduction within those segments, and various monitoring inputs 24,26. The six control outputs 22 include six digital logic control signals each of which controls current conduction within a corresponding one of the segments. The circuit 20 employs a firing code that has six bits. Each of the six bits is set when a corresponding segment is to fire (e.g., bit 0 for APn, bit 1 for BPn, bit 2 for CPn, bit 3 for ANn, bit 4 for BNn, and bit 5 for CNn). Each time a firing occurs, two cells are fired. Also, a cell is usually fired a second time in order that the second firing occurs in the next subsequent firing (e.g., by first firing APn and CNn with the firing code=$100001_2$, followed by firing CNn and BPn with the firing code= $100010_2$).

Monitors 28A,28B,28C provide conduction monitor signals to the inputs 26 for the three AC phases A,B,C. The monitors 28A,28B,28C monitor the respective phases A,B,C to provide corresponding conduction signals. The control and monitoring circuits 20 also input current signals from the shunts 30,32 and use that information to control the output of the respective bridges 2,4 through DC contact actuators (not shown).

Figure 2:
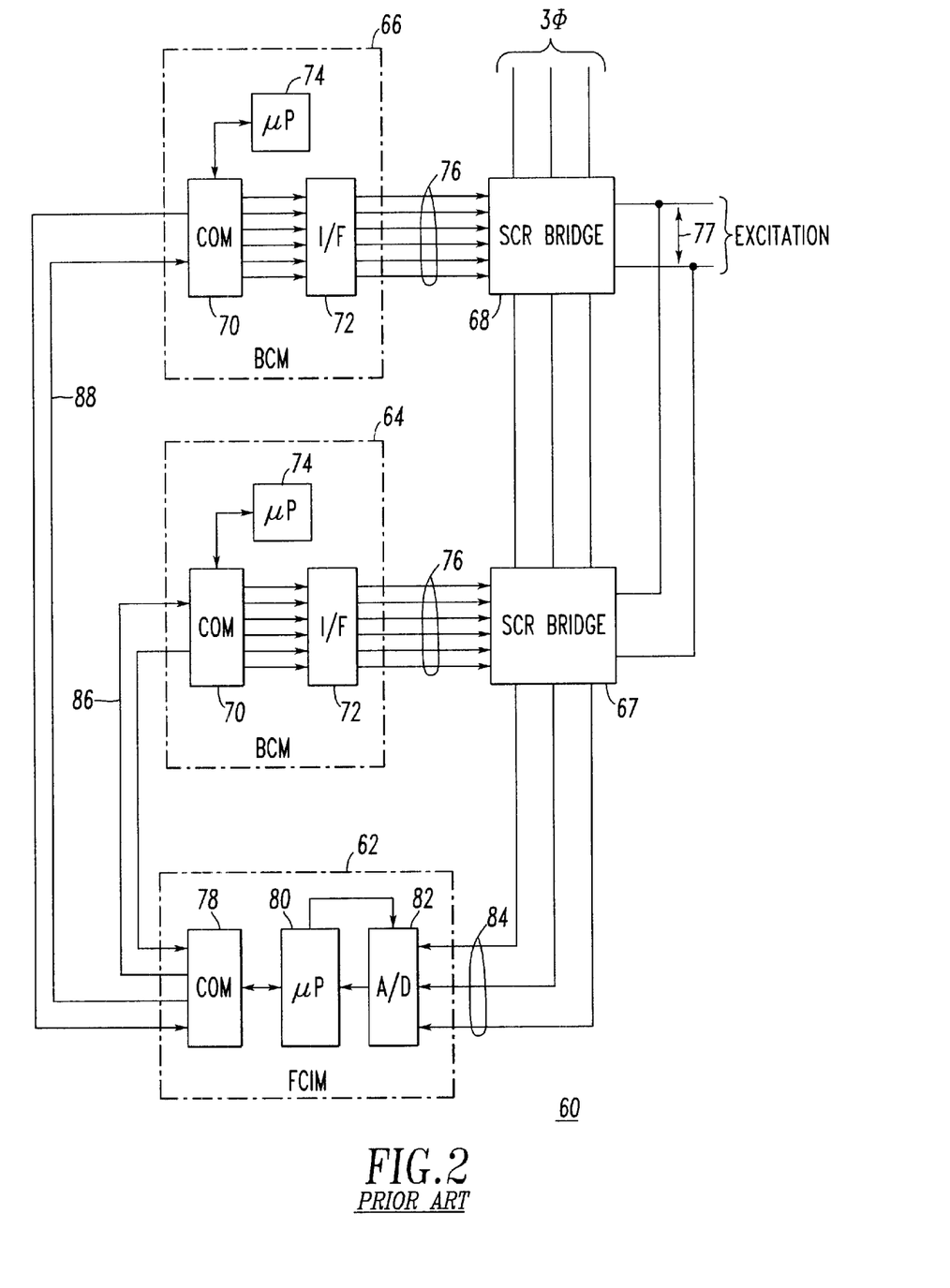
FIG. 2 is a block diagram of a firing control interface module (FCIM) and two bridge control modules (BCMs).

FIG. 2 is a block diagram of a control system 60 including a firing control interface module (FCIM) 62 and two bridge control modules (BCMs) 64,66 for respective SCR bridges 67,68. Each of the BCMs 64,66 includes a suitable communications interface (COM) 70, an interface (I/F) 72 to the corresponding bridge 67,68, and a suitable microprocessor ($\mu$P) 74. The COM 70 and $\mu$P 74 cooperate to send six exemplary filing pulses 76 to all of the segments in the corresponding bridge 67,68. The SCR bridges 67,68 output a rectified voltage 77.

The SCR bridge 67, for example, has its own BCM 64, which communicates with the FCIM 62. The FCIM 62 monitors the input voltage to the bridges 67,68 and also communicates with the other BCM 66. Although two exemplary bridges 67,68 are shown, one, three, or more parallel bridges may employed. It will be appreciated that the FCIM 62 controls and communicates with additional bridges in a similar manner.

The FCIM 62 includes a suitable communications interface (COM) 78, a suitable microprocessor ($\mu$P) 80, and an A/D converter 82 which samples the voltages of the three phases 84 through a suitable interface (not shown). The COM 78 of the FCIM 62 communicates with the COMs 70 of the BCMs 64,66 through suitable communication channels 86,88, respectively. In this manner, the FCIM 62 controls the BCMs 64,66 through the corresponding communication channels.

Figure 3:
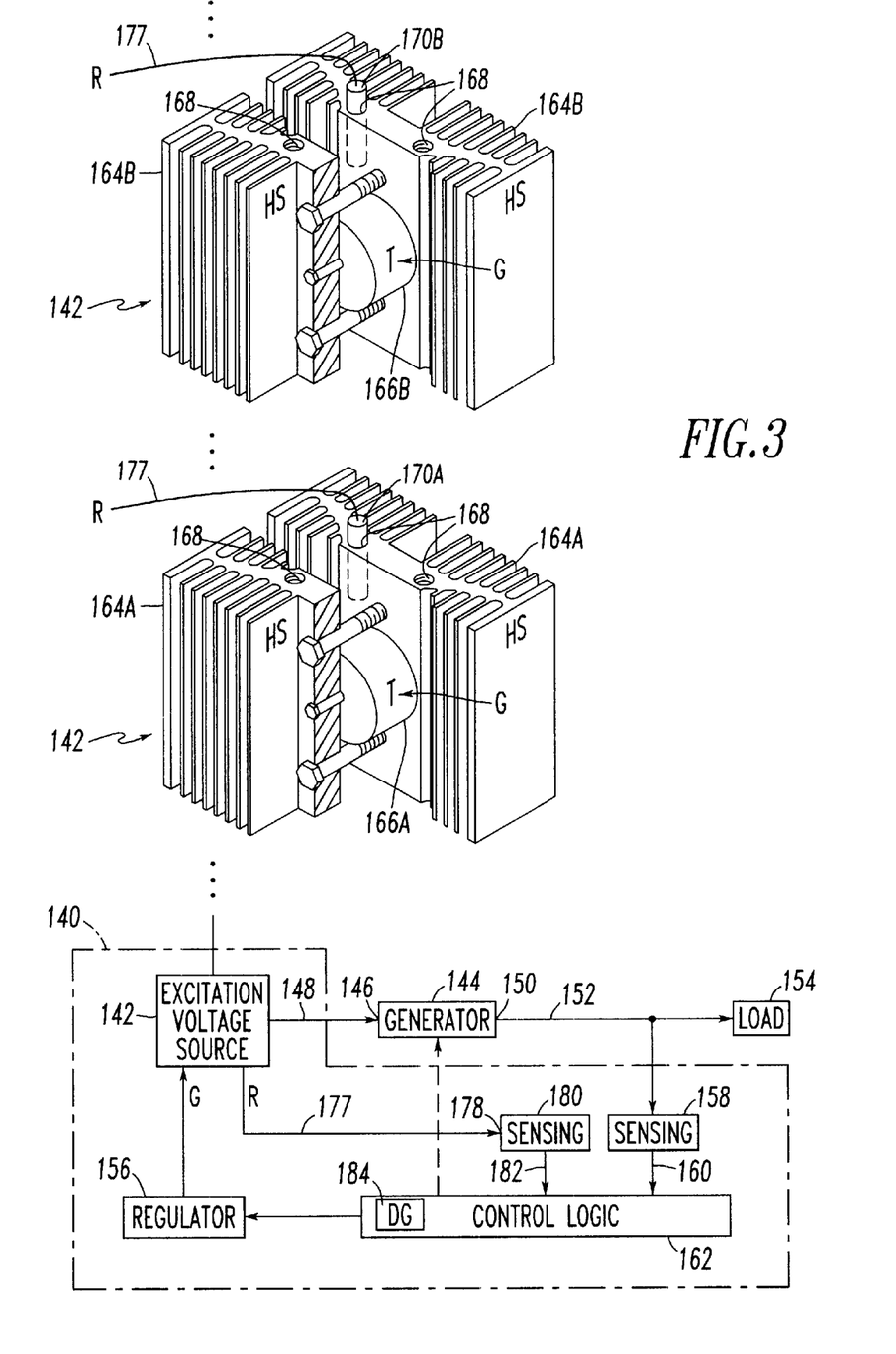
FIG. 3 is a block diagram of an excitation control system including a rectifier circuit having plural heat sinks and also including a temperature sensing circuit in accordance with the present invention.

FIG. 3 shows an excitation control system 140 including an excitation voltage source, such as a rectifier bridge 142. Examples of an excitation control system are disclosed in U.S. Pat. Nos. 6,208,120; and 6,232,751, which are incorporated by reference herein. The exemplary excitation control system 140 is for a rotating electrical apparatus, such as the exemplary generator 144. The generator 144 includes an input 146 responsive to an excitation voltage 148 and an output 150 having one or more alternating current phases 152, each having a current flowing therein and a voltage, which supply power to a load 154. One or more circuit breakers (not shown) may be disposed between the generator 144 and the load 154. The excitation voltage source 142 provides the excitation voltage 148 to the input 146 of the generator 144. A regulator, such as a bridge control circuit 156 adapted to control the source 142, regulates the excitation voltage 148. A first sensing sub-system 158 for the alternating current phases 152 senses generator current and/or generator voltage and provides an electrical signal 160 (e.g., generator line current, generator watts) to control logic 162 for the regulator 156 and generator 144.

The excitation control system 140 employs the excitation voltage source 142, which in the exemplary embodiment is a three-phase rectifier circuit, to convert alternating current (AC) sinusoidal signal waveforms to direct current (DC). The three-phase rectifier circuit 142 includes one or more heat sinks (HS), such as 164A,164B, and a plurality of semiconductor devices, such as the exemplary thyristors (T) 166A,166B or semiconductor controlled rectifiers (SCRs), which thermally engage the respective heat sinks. In the exemplary embodiment, two heat sinks are employed for each thyristor, although other counts are possible (e.g. without limitation, one heat sink per thyristor; one heat sink per plural thyristors). The semiconductor devices are disposed in bridge segments, with typically one thyristor or SCR for each polarity of each AC phase. The regulator 156 includes a bridge firing control circuit (not shown) to control the firing point for each thyristor in each AC cycle.

The thyristors 166A,166B are suitably mounted on and thermally engage the respective heat sinks 164A,164B and, during operation of the three-phase rectifier circuit 142, raise the temperature thereof. The heat sinks 164A,164B include one or more openings 168. Preferably, electrically insulating bodies of RTD assemblies 170A,170B are suitable engaged (e.g., force fitted) with the heat sinks 164A,164B, respectively, at the openings 168 thereof. Preferably, a suitable thermal compound (not shown) is disposed in the openings 168. Alternatively, electrically conductive bodies of RTD assemblies (not shown) may be employed which mechanically, electrically and thermally engage the heat sinks 164A,164B at the openings 168 thereof. In the exemplary embodiment, the RTD assembly is positioned proximate the cathode side of the thyristor, which is normally the hottest side thereof.

Each of the RTD assemblies 170A,170B has an output (R) 177, which is connected to an input 178 of a conventional RTD temperature sensing circuit 180, which provides a temperature sensor signal 182 to the control logic 162. The circuit 180 is adapted to measure the temperature of the heat sinks, such as 164A, from the temperature dependent resistance of the RTD assemblies, such as 170A.

For example, the circuit 180 may include a Model 3B34 single-channel signal conditioning module, marketed by Analog Devices, which amplifies, protects, filters, linearizes and isolates analog input voltages from a wide variety of two-, three- and four-wire RTDs, providing simultaneous precision voltage and current outputs, which are linear to input temperature. For example, the circuit 180 measures a value of resistance from one of the RTD assemblies 170A, 170B, and determines the temperature of the respective one of the heat sinks 164A,164B from that value.

In accordance with the invention, a circuit (DG) 184 disables gating of one or more of the semiconductor devices 166A,166B based upon the temperature of the respective heat sinks 164A,164B.

Figure 4:
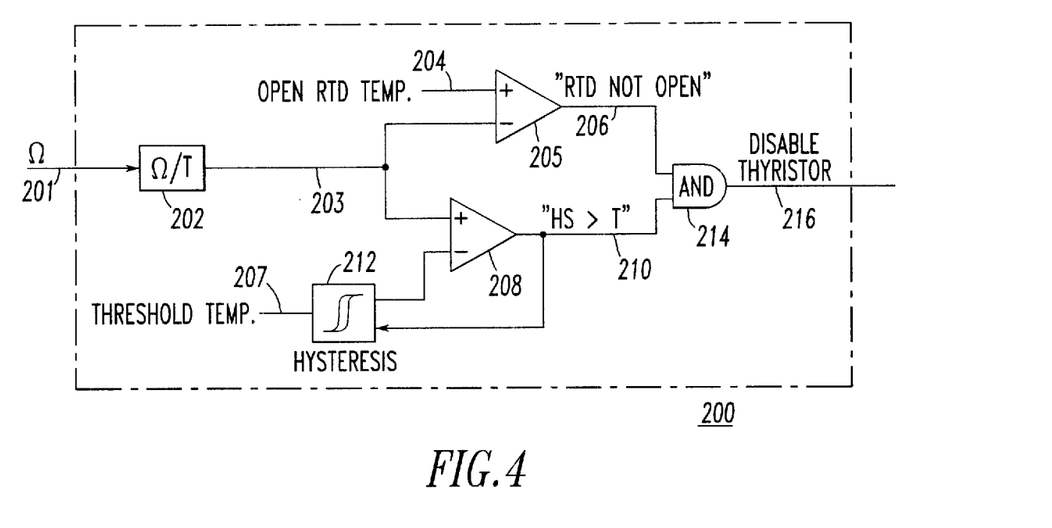
FIG. 4 is a block diagram of a routine employed to disable gating to a particular thyristor for which a heat sink temperature has exceeded a threshold temperature in accordance with an embodiment of the invention.

FIG. 4 shows the logic 200 employed by a circuit, such as 184 of FIG. 3, for disabling gating of one of the semiconductor devices 166A,166B. Preferably, the logic 200 is performed by a suitable processor, such as the microprocessor 74 of FIG. 2. Alternatively, digital and/or analog logic may be employed. Other similar logic, such as 200, and circuits, such as 184, may be employed to disable gating for each of the other semiconductor devices 166A,166B of the three-phase rectifier circuit 142. A signal 201, which corresponds to the input 178 of the RTD temperature sensing circuit 180 of FIG. 3, is input by a suitable conversion circuit 202. The circuit 202 determines an RTD temperature signal 203, such as the temperature sensor signal 182 of FIG. 3, which is the temperature of the corresponding heat sink.

A suitable signal 204 is predetermined (e.g., stored in non-volatile memory of the microprocessor) to define an expected temperature (e.g., without limitation, about 225° C.; a suitable unrealistic value) of an open (e.g., failed) RTD. A first comparator 205 compares the signals 204,203 and outputs a signal 206, which when true (i.e., the open RTD temperature signal 204 is greater than the RTD temperature signal 203) indicates that the corresponding RTD is not open.

A suitable signal 207 is predetermined (e.g., stored in non-volatile memory of the microprocessor) to define a threshold temperature (e.g., without limitation, less than the signal 204; about 70° C. to about 120° C.) of a sufficiently over-temperature heat sink. A second comparator 208 compares the signals 203,207 and outputs a signal 210, which when true (i.e., the RTD temperature signal 203 is greater than the threshold temperature signal 207) indicates that the corresponding RTD heat sink temperature has exceeded the threshold temperature. In turn, the two signals 206,210 are ANDed by AND function 214, which outputs a disable thyristor signal 216. In turn, the signal 216 is employed by the bridge control circuit 156 of FIG. 3 to disable gating of the corresponding semiconductor device, such as 166A, 166B, based upon the temperature of the corresponding heat sink 164A,164B, whenever the corresponding RTD assembly 170A,170B, is not open.

Preferably, a hysteresis function 212 is employed to decrease the predetermined threshold 207 at the (−) input of the comparator 208 when the signal 210 is true (i.e., the temperature of the heat sink is greater than the predetermined threshold 207), and to increase the predetermined threshold 207 at that (−) input when the signal 210 is false (i.e., the temperature of the heat sink is less than the predetermined threshold 207).

Figure 5:
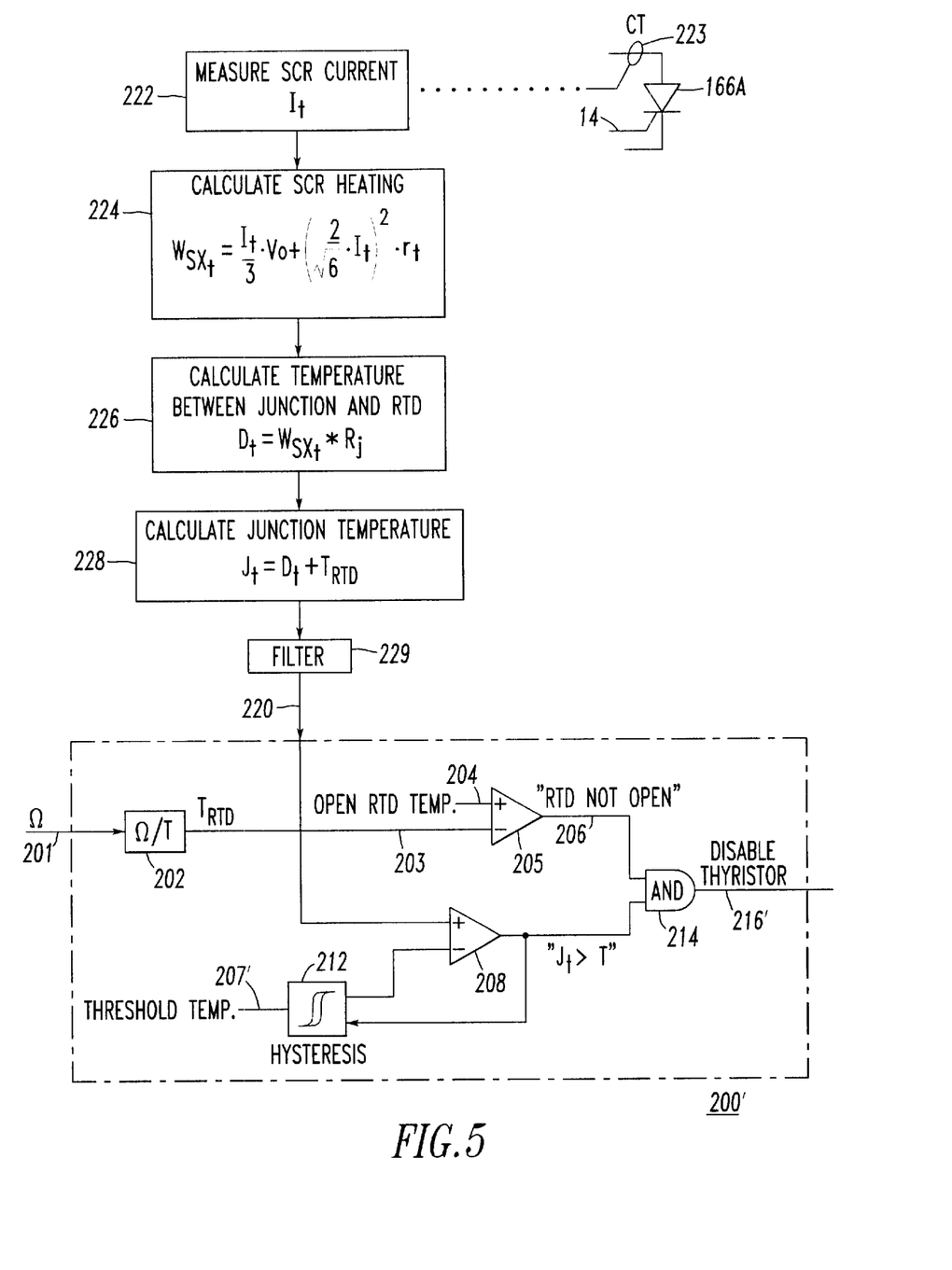
FIG. 5 is a block diagram of another routine employed to disable gating to a particular thyristor for which a junction temperature has exceeded a threshold temperature in accordance with another embodiment of the invention.

FIG. 5 shows the logic 200' employed by a circuit, such as 184 of FIG. 3, for disabling gating of one of the semiconductor devices 166A,166B. Preferably, the logic 200' is performed by a suitable processor, such as the microprocessor 74 of FIG. 2. The logic 200' is similar to the logic 200 of FIG. 4, except that a calculated signal 220 is input by the (+) input of the comparator 208, and a suitable signal 207' is predetermined (e.g., stored in non-volatile memory of the microprocessor) to define a threshold temperature (e.g., without limitation, less than the signal 204; about 125° C. to about 140° C.) of a sufficiently over-temperature thyristor or SCR junction.

First, at 222, the thyristor or SCR current, $I_t$, is measured. For example, the SCR current may be measured by a dedicated current transformer (CT) 223 or by employing conduction monitors and shunts to measure peak average current (see, e.g., U.S. Pat. No. 5,963,441). Next, at 224, the thyristor or SCR heating, $W_{SXt}$, which is the wattage output by the thyristor or SCR junction, is calculated per Equation 1:

$$W_{SXt} = \frac{I_t}{3} \cdot V_o + \left(\frac{2}{\sqrt{6}} \cdot I_t\right)^2 \cdot r_t \qquad \text{(Eq. 1)}$$

wherein:
Vo is a constant (volts) for the thyristor or SCR; and
$r_t$ is a constant (ohms) for the thyristor or SCR.

Then, at 226, the temperature rise, $D_t$, between the thyristor or SCR junction and the RTD (heat sink) is calculated from Equation 2:

$$D_t = W_{SXt} * R_j \qquad \text{(Eq. 2)}$$

wherein:
Rj is thermal impedance (Ω) from thyristor or SCR junction to the RTD (heat sink).

Finally, at 228, the thyristor or SCR junction temperature, $J_t$, is calculated from Equation 3:

$$J_t = D_t + T_{RTD} \qquad \text{(Eq. 3)}$$

wherein:
$T_{RTD}$ is the temperature 203, which is determined from the RTD by circuit 202.

The calculated signal 220 from step 228 is suitably filtered at 229 and is, then, input by the logic 200'. In turn, the signal 216' is employed by the bridge control circuit 156 of FIG. 3 to disable gating of the corresponding semiconductor device, such as 166A,166B, based upon the temperature of the corresponding heat sink 164A,164B, as modified by the temperature, $D_t$, between the thyristor or SCR junction and the RTD (heat sink), whenever the corresponding RTD assembly 170A,170B, is not open.

The signals 216,216' may advantageously be employed to disable one or more semiconductor devices in one or more rectifier bridges. Preferably, the logic 200,200' is repeated for each corresponding semiconductor device.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method for controlling a rectifier bridge including a heat sink having a temperature, and also including a semiconductor device thermally engaging the heat sink and having a gate, said method comprising:
controlling said rectifier bridge through the gate of said semiconductor device;
measuring the temperature of said heat sink;
disabling gating of the semiconductor device based upon the temperature of said heat sink;
employing said semiconductor device having a junction and a junction temperature;
calculating said junction temperature;
disabling gating of said semiconductor device when said junction temperature exceeds a predetermined threshold;
thermally engaging said heat sink with an RTD;
measuring a value from the RTD;
determining the temperature of said heat sink from said value;

measuring current flowing in said semiconductor device;

calculating heating of said semiconductor device from said current;

calculating a temperature rise between the junction and the RTD; and calculating said junction temperature by adding the temperature rise to the temperature of said heat sink.

2. A method for controlling a rectifier bridge including a heat sink having a temperature, and also including a semiconductor device thermally engaging the heat sink and having a gate, said method comprising:

controlling said rectifier bridge through the gate of said semiconductor device;

measuring the temperature of said heat sink;

disabling gating of the semiconductor device based upon the temperature of said heat sink;

thermally engaging said heat sink with an RTD; measuring a value from the RTD;

determining the temperature of said heat sink from said value;

providing a first signal, which is true when said RTD is not open;

providing a second signal, which is true when the temperature of said heat sink is greater than a predetermined threshold;

disabling gating of said semiconductor device when the first and second signals are both true;

employing hysteresis to decrease said predetermined threshold when the temperature of said heat sink is greater than said predetermined threshold; and employing hysteresis to increase said predetermined threshold when the temperature of said heat sink is less than said predetermined threshold.

* * * * *